Feb. 12, 1935. C. W. P. HEYLANDT Re. 19,458
GAS SUPPLYING METHOD AND DEVICE THEREFOR
Original Filed Feb. 16, 1928
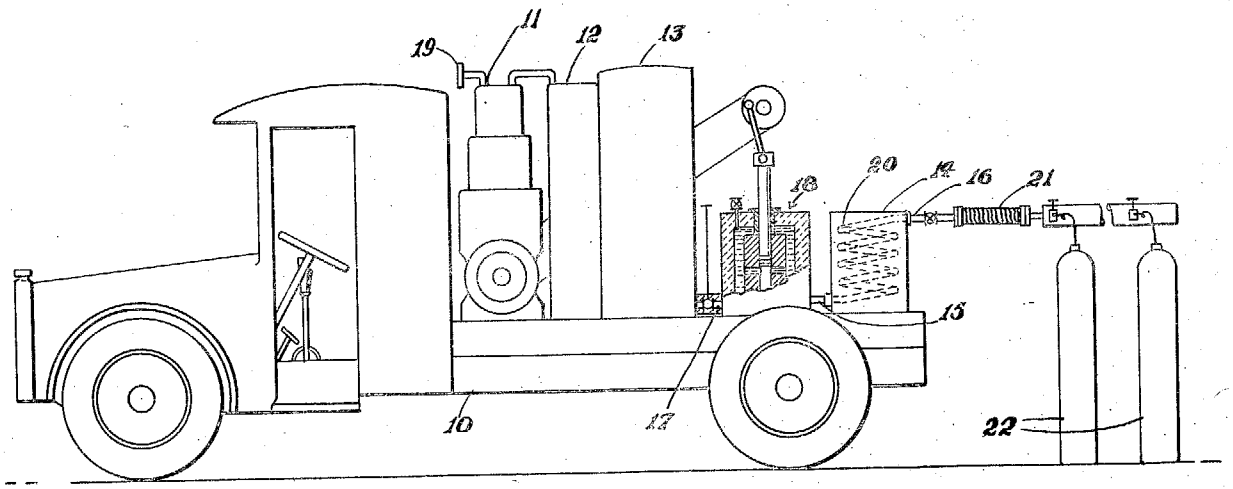
INVENTOR
Christian Wilhelm Paul Heylandt
BY
Watson, Bristol, Johnson & Leavenworth
ATTORNEYS Reissued Feb. 12, 1935

Re. 19,458

UNITED STATES PATENT OFFICE 19,458

GAS SUPPLYING METHOD AND DEVICE THEREFOR

Christian Wilhelm Paul Heylandt, Berlin-Britz, Germany, assignor to Fluga Aktiengesellschaft, St. Moritz, Switzerland, a corporation of Switzerland Original No. 1,826,248, dated October 6, 1931, Serial No. 254,912, February 16, 1928. Application for reissue April 28, 1933, Serial No. 668,388. In Germany February 24, 1927

6 Claims. (Cl. 62—1)

This invention relates to a method and apparatus for supplying gas under pressure, particularly an industrially utilizable gas characterized by a low boiling point, such as oxygen, and which may be had from sources other than by mechanical air separation; for example, that had as a waste product from a chemical process. Such gas, when its liquefaction has been accomplished in a suitable manner, may be delivered to consumers in the liquid phase in receptacles designed for the purpose and thereafter used industrially at any desired place.

In large gas producing plants, where relatively large quantities of gas are stored, but where the gas consumption is relatively small, there is a certain amount of excess gas which must be permitted to escape uselessly into the atmosphere, so that the inability of utilizing such gas has an important bearing on the overall efficiency of the plant. This is particularly true of those chemical processes where gases are produced for chemical synthesis (ammonia-synthesis, electrolytic-decomposition of water and the like), especially when only one of two or more component gases can be used industrially, whereby the rest must be allowed to escape uselessly. It is chiefly the oxygen and nitrogen components which are liberated in certain manufacturing processes.

In accordance with the present invention, such gaseous products are subjected to liquefaction whereby they may be stored in the liquid phase and occupy a relatively small amount of space, as compared with compressed gases stored in steel cylinders, and by reason of their smaller shipping weight may be readily transported relatively great distances and utilized wherever required.

It has already been proposed to transport liquefied gases having a low boiling point, such as oxygen, in relatively large quantities and in special vessels and to convert them into gas under pressure at the place of consumption. Such gases, however, were transferred in the liquid phase at the place of consumption from the transporting vessels into so-called cold or warm vaporizers, in which the conversion into gas took place; in cold vaporizers, the resulting pressure being approximately 30 atmospheres and in the warm vaporizer 150 atmospheres. This method of converting the liquefied gas into gas under pressure necessitates, however, for small consumers, which represent the majority of the customers, an investment of a relatively large amount of capital in vaporizers at the place of consumption.

It has also been proposed to vaporize the liquefied gas within the transporting vessel at the place of consumption and to use it as gas of the desired working pressure. This is confined to cases where at the place of consumption only low working pressures (15 atmospheres and the like) are required, since in the case of high pressures, the vessels must necessarily be of exceedingly strong and heavy construction, whereby the economy of transporting the gas in the liquid phase would be offset.

In the practice of the present invention, these limitations are overcome by providing a portable plant on transporting means arranged for supplying the gas, such as oxygen, under pressure; such plant includes means for supplying the liquid oxygen and a pressure gas producer. The means for supplying the liquid oxygen may be a transporting vessel which is preferably mounted together with the pressure gas producer on a single transporting device, for instance on a motor truck, although they may be mounted separately.

For the purpose of supplying liquefied gas, a gas-producer and a liquefying apparatus may also be arranged in common upon the transporting means. The liquefying apparatus may be supplied, for instance, with a gas compressor and operated to produce liquefied gases in a known manner. When the liquid is transported, it may be pressed by means of external energy into the receiver provided for it.

In the accompanying drawing, the figure shows, mainly in side elevation, an embodiment of the invention using a motor vehicle for transporting the portable plant.

In this embodiment a motor truck 10 is shown as the transporting means and has mounted on it a liquefied gas supplying apparatus comprising by way of example, a compressor 11, a heat interchanger 12, and a container 13 for the gas material when liquefied. Associated with the liquid supplying apparatus on the truck, there is a vaporizing apparatus 14 having an inlet 15 for liquefied gas drawn from the container 13 and an outlet 16 for gas material in the gas phase; there being a connection 17 leading from the container 13 to the inlet 15 which includes suitable pressing means, such as a mechanically actuated pump 18 of a character adapted to pump a liquefied gas, volatile at normal atmospheric temperature and pressure, for example, a liquid oxygen pump. The compressor 11 is preferably provided with an inlet coupling 19 by which connection with the source of by-product gas to be liquefied is made.

The vaporizing apparatus 14, while of any suitable form that is adapted to deliver gas material converted from the liquid phase to the gas phase at a relatively high pressure, preferably has an artificial source of heat and is accordingly shown as comprising a heat absorbing coil 20 submerged in a bath. A delivery connection, such as coupling 21, leads from the outlet 16 of the vaporizing apparatus to a consuming or storing device; the latter may be, for example, a plurality of storage cylinders, as shown at 22, located in any suitable place.

In operation, the liquefied gas under substantially no pressure or under a relatively low one is transferred from the supplying apparatus to the vaporizer and is there converted into gas under such pressure (say 2000 to 3000 pounds per square inch) as may be desired and, in that condition, is supplied to the consuming device.

The principal advantage of the present process consists in the fact that the consumer can be supplied much more quickly than heretofore with gas at any desired pressure without the necessity of every consumer being provided with vaporizing apparatus. A further advantage is that such gases as are obtained as by-products in the manufacture of nitrogen and hydrogen, can by this method be used, instead of permitting them to escape into the atmosphere as heretofore.

Having described my invention, what I claim as new and desire to secure by Letters Patent, is:

1. A method of dispensing a gas of a low boiling point for industrial use at a desired pressure which comprises transferring gas material in the liquid phase from transportable gas collecting, liquefying and supplying apparatus, pressing the liquid against a relatively high pressure when drawn from said supplying apparatus into a transportable receiver applying heat to said liquid for converting the same into gas at the desired high pressure, and delivering said high pressure gas at a place of consumption.

2. A method of dispensing a gas of a low boiling point for industrial use at a desired pressure which comprises transferring liquefied gas at intervals directly from transportable gas collecting, liquefying and supplying apparatus, pressing the transferred liquefied gas by means of external energy against a high pressure, applying heat to said transferred liquid to convert the same into gas at the desired high pressure, and delivering the gas produced at said high pressure for use at a place of consumption.

3. A method of dispensing a gas of a low boiling point for industrial use at a desired pressure which comprises collecting, compressing and liquefying gas material in a manner which provides a supply of gas in the liquid phase at a relatively low pressure, pressing at intervals by means of externally obtained power, the liquefied gas drawn from said supply against a high pressure, applying heat to said withdrawn liquid subsequently to said pressing operation whereby the gas material in the liquid phase is converted into the gas phase at a desired high pressure, and delivering said high pressure gas to a receiving device at a place of consumption.

4. A method of dispensing a gas of low boiling point for industrial use at a desired pressure which comprises collecting a waste gaseous product by means of transportable apparatus, subjecting the same to liquefaction and temporarily storing the gaseous product in the liquid phase, transferring a desired amount of the stored liquefied gas at intervals at the place of use to a high pressure receiver by pressing the transferred liquefied gas by means of externally obtained power against the pressure in said receiver, and delivering the gas produced at said high pressure for use at the place of consumption.

5. A method of dispensing gas of low boiling point for industrial use at a desired pressure, which comprises providing a supply of collected and liquefied gas material at a relatively low pressure in a transportable apparatus including a container, pressing at intervals liquefied gas withdrawn from said container to force the same into transportable vaporizing apparatus against a relatively high pressure, applying heat to the material passed to said vaporizing apparatus for converting the same into gas at said relatively high pressure, and supplying consuming apparatus from the vaporizing apparatus at the desired high pressure.

6. A method of dispensing a gas of low boiling point for industrial use at a desired pressure, which comprises cooling an evaporated gas, liquefying and storing the same at a relatively low pressure in transportable apparatus including a container, pressing at intervals liquefied gas withdrawn from said container to force the same into vaporizing apparatus against a relatively high pressure, applying heat to the material passing in said vaporizing apparatus to convert the same into gas at said relatively high pressure, and discharging the gas produced to consuming apparatus at the desired high pressure.

CHRISTIAN WILHELM PAUL HEYLANDT.